(12) United States Patent
Wu et al.

(10) Patent No.: US 11,637,598 B2
(45) Date of Patent: Apr. 25, 2023

(54) MIMO TRANSMISSION METHOD FOR DISCRETE MODULATED SIGNALS

(71) Applicant: SHANGHAI JIAO TONG UNIVERSITY, Shanghai (CN)

(72) Inventors: Yongpeng Wu, Shanghai (CN); Jie Feng, Shanghai (CN); Feng Shu, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 115 days.

(21) Appl. No.: 17/422,452

(22) PCT Filed: Aug. 26, 2020

(86) PCT No.: PCT/CN2020/111230
§ 371 (c)(1),
(2) Date: Jul. 13, 2021

(87) PCT Pub. No.: WO2022/016657
PCT Pub. Date: Jan. 27, 2022

(65) Prior Publication Data
US 2022/0345183 A1    Oct. 27, 2022

(30) Foreign Application Priority Data
Jul. 21, 2020    (CN) .......................... 202010707389.9

(51) Int. Cl.
*H04B 7/02*    (2018.01)
*H04B 7/0456*    (2017.01)
*H04W 52/42*    (2009.01)

(52) U.S. Cl.
CPC .......... *H04B 7/0456* (2013.01); *H04W 52/42* (2013.01)

(58) Field of Classification Search
CPC .. H04B 7/0456; H04B 7/0617; H04B 7/0413; H04B 7/0426; H04W 52/42; Y02D 30/70
(Continued)

(56) References Cited

U.S. PATENT DOCUMENTS

| 9,325,538 B2 * | 4/2016 | Jia ........................ H04B 7/0417 |
| 10,009,077 B2 * | 6/2018 | Murakami ............ H04L 1/0045 |
| 2019/0280809 A1 | 9/2019 | Cho et al. |

FOREIGN PATENT DOCUMENTS

| CN | 101902432 | 12/2010 |
| CN | 106105075 | 11/2016 |

(Continued)

OTHER PUBLICATIONS

"International Search Report (Form PCT/ISA/210) of PCT/CN2020/111230," dated Mar. 22, 2021, pp. 1-4.
(Continued)

*Primary Examiner* — Helene E Tayong
(74) *Attorney, Agent, or Firm* — JCIP Global Inc.

(57) ABSTRACT

The present invention provides a MIMO transmission method for discrete modulated signals. The method is mainly characterized in maximizing the mutual information of symbol vectors of a transmitter and a receiver by joint optimization of a source distribution and a precoding matrix. When the current precoding matrix G is determined, the distribution of source multi-dimensional vectors x is maximized by a Lagrange multiplier method to maximize a source entropy; and when the distribution of the current source multi-dimensional vectors x is determined, the precoding matrix G is optimized by a gradient descent method to maximize the mutual information of the transmitted and received vectors. The transmission rate approximates the Shannon limit under a MIMO scenario by joint optimization of the source distribution and the precoding matrix. After the transmitter determines a marginal distribution of symbols of (Continued)

each channel, a non-uniform modulation is performed by using a probabilistic amplitude shaping technology.

3 Claims, 2 Drawing Sheets

(58) Field of Classification Search
USPC .......................................................... 375/267
See application file for complete search history.

(56) References Cited

FOREIGN PATENT DOCUMENTS

| | | |
|---|---|---|
| CN | 107332595 | 11/2017 |
| CN | 108988920 | * 12/2018 |

OTHER PUBLICATIONS

"Written Opinion of the International Searching Authority (Form PCT/ISA/237) of PCT/CN2020/111230," dated Mar. 22, 2021, pp. 1-5.

* cited by examiner

MIMO TRANSMISSION METHOD FOR DISCRETE MODULATED SIGNALS

CROSS-REFERENCE TO RELATED APPLICATION

This application is a 371 of international application of PCT application serial no. PCT/CN2020/111230, filed on Aug. 26, 2020, which claims the priority benefits of China application no. 202010707389.9, filed on Jul. 21, 2020. The entirety of each of the above-mentioned patent applications is hereby incorporated by reference herein and made a part of this specification.

BACKGROUND

Technical Field

The present invention relates to the field of communications, in particular to a multiple input multiple output (MIMO) transmission method for discrete modulated signals.

Description of Related Art

According to the Shannon equation, when the transmitting power is limited to P, the condition of reliable transmission on an additive white Gaussian noise (AWGN) channel per unit noise power is a transmission rate on each dimension not exceeds the capacity-power function: $C(P) = \frac{1}{2}\log_2(1+P)$. According to the information theory, in order to achieve the channel capacity of the AWGN channel, input signals have to satisfy the continuous and uniform Gaussian distribution. Therefore, traditional modulation modes of uniform distribution, such as amplitude shift keying (ASK) and quadrature amplitude modulation (QAM), did not satisfy the optimal condition of Gaussian distribution.

In order to make the wireless transmission rate approximate to the Shannon limit, many scholars have studied and invented some modulation modes of non-uniform distribution. Georg Böcherer et al. proposed a non-uniform distribution modulation based on dipolar amplitude shift keying. They proposed that symbol distribution should satisfy the Maxwell-Boltzmann distribution to maximize an information entropy of symbols under the condition that the transmitting power was limited. On this basis, they maximized the mutual information of signals of a transmitter and a receiver to obtain a suboptimal symbol distribution of the transmitter. After the symbol distribution was known, uniformly distributed source bits were transformed into a symbol sequence in accordance with the Maxwell-Boltzmann distribution by fixed composition distribution matching (CCDM) and low density parity check code (LDPC) encoding. This technique was called probabilistic amplitude shaping (PAS). Experiments have proved that under the AWGN channel, this technique can save about 1 dB of energy during 8ASK modulation to achieve the same frame error rate, compared to the traditional uniform distribution. However, the above technique is only for the case of single-antenna wireless transmission, but not for MIMO to obtain an optimal symbol distribution.

SUMMARY

Aiming at the shortcomings in the prior art, the objective of the present invention is to provide an MIMO transmission method for discrete modulated signals, which performs joint optimization on a given MIMO encoding matrix and a source symbol distribution under ASK modulation and the encoding matrix to maximize the mutual information of symbols of a transmitter and a receiver, which theoretically approximates the Shannon limit and maximizes the MIMO transmission rate, thereby solving the problem that the power gain needs to be further improved because the probabilistic amplitude shaping (PAS) technology does not consider the characteristics of MIMO itself.

The technical solution provided by the present invention is:

A MIMO transmission method for discrete modulated signals, an MIMO transmission model for discrete modulated signals is $y = HG\Delta x + n$, where X is the source multi-dimensional vectors of initial multi-channel ASK constellation diagram symbols, y is received signals of each channel obtained by a receiver, H is a known channel matrix, G is a precoding matrix of MIMO, and $\Delta$ is a constellation expansion factor. The method includes the following steps:

(S1) initializing the precoding matrix G;

(S2) for any constellation expansion factor $\Delta$, maximizing a source entropy H(x) by adjusting a source distribution $P_x$ of the source multi-dimensional vectors x, and selecting the constellation expansion factor $\Delta$ and source distribution $P_x$ for maximizing a mutual information $I(x;y) = H(x) - H(x|y)$ according to the current precoding matrix G, where H(x|y) is a conditional entropy;

(S3) according to the current constellation expansion factor $\Delta$ and source distribution $P_x$, adjusting the precoding matrix G by a gradient descent method to further maximize the mutual information I(x;y);

(S4) determining whether the values of the current constellation expansion factor $\Delta$, source distribution $P_x$ and precoding matrix G converge, and if the values do not converge, performing step (S2); and (S5) obtaining a marginal distribution of the symbols of each channel in the source multi-dimensional vectors x according to the distribution of the source multi-dimensional vectors X, and performing non-uniform modulation on the signals of each channel by a single-channel probabilistic amplitude shaping technology.

A further improvement of the present invention lies in that in step (S2), for any given constellation expansion factor $\Delta$, maximum entropy optimization is performed on the source multi-dimensional vectors x by a Lagrange multiplier method, and an optional constellation expansion factor $\Delta$ and an optimal source distribution $P_x$ of the source multi-dimensional vectors x are finally determined by maximizing the mutual information I(x;y).

A further improvement of the present invention lies in that step (S3) includes the following steps:

(S31) calculating a gradient expression of the mutual information I(s;y) on the precoding matrix G; and (S32) based on the gradient descent method, adjusting the value of each element in the current precoding matrix G; and if the adjusted precoding matrix G does not conform to a power limit, multiplying G by a zoom multiple on the basis of gradient adjustment to meet power requirements.

Compared with the prior art, the present invention has the following beneficial effects:

1. Compared to the traditional MIMO system for discrete uniform modulation, the present invention makes the transmission rate more approximate to the Shannon limit by a non-uniform modulation technology.

2. Compared to the single-antenna PAS non-uniform modulation technology, the present invention further increases the gain brought by probabilistic amplitude shaping under MIMO through joint optimization of a precoding matrix and multi-channel signal distribution for the characteristics of multiple antennas of the MIMO system.

BRIEF DESCRIPTION OF THE DRAWINGS

After reading detailed descriptions of non-limiting embodiments with reference to the following accompanying drawings, other features, objectives and advantages of the present invention will become more apparent.

DESCRIPTION OF THE EMBODIMENTS

The present invention will be described in detail below with reference to the specific embodiments. The following embodiments are helpful for those skilled in the art to further understand the present invention, but do not limit the present invention in any form. It should be noted that many variations and improvements can be made for those of ordinary skill in the art without departing from the concept of the present invention. These variations and improvements fall into the protection scope of the present invention.

Figure 1:
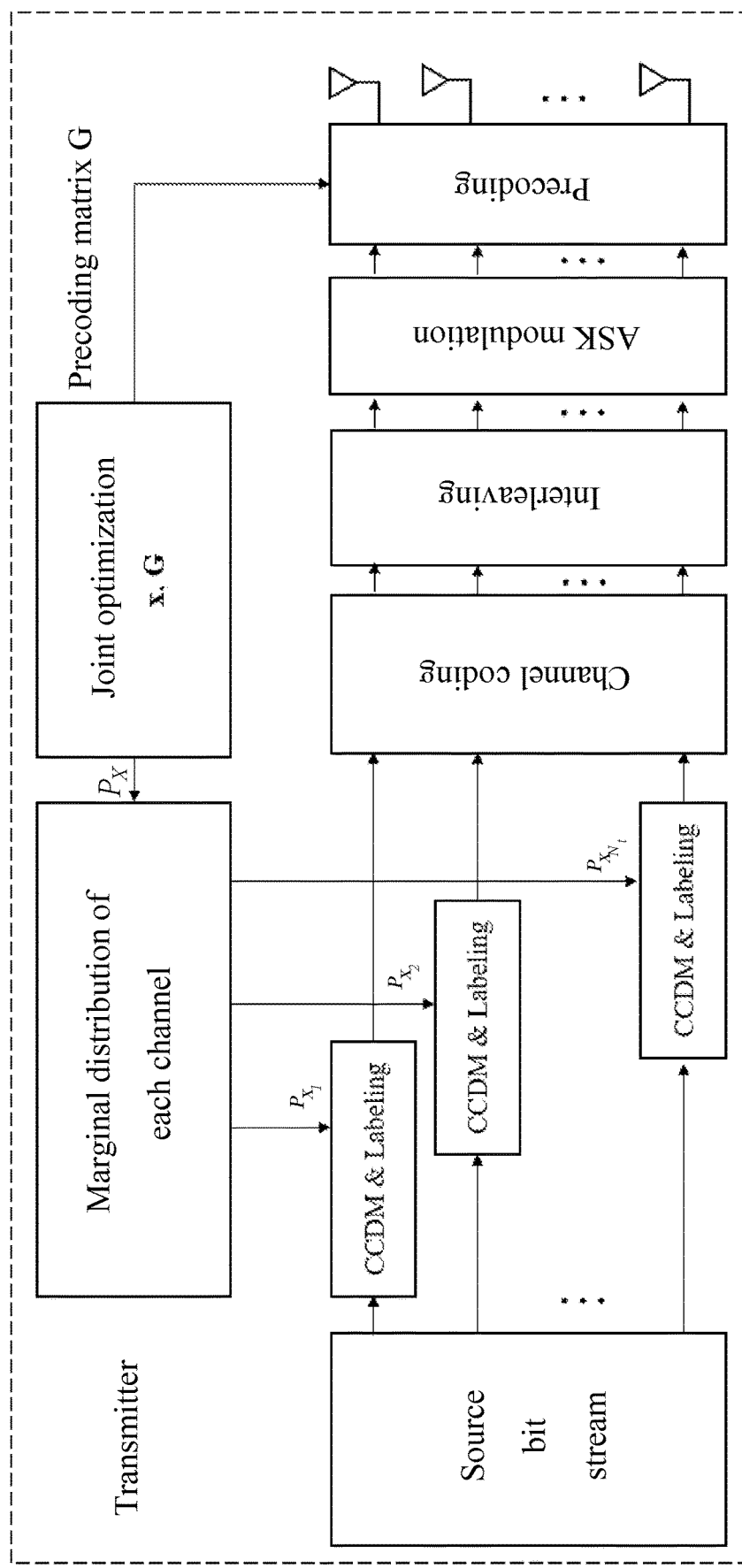
FIG. 1 is a schematic diagram of a transmitter according to the present invention.
Figure 2:
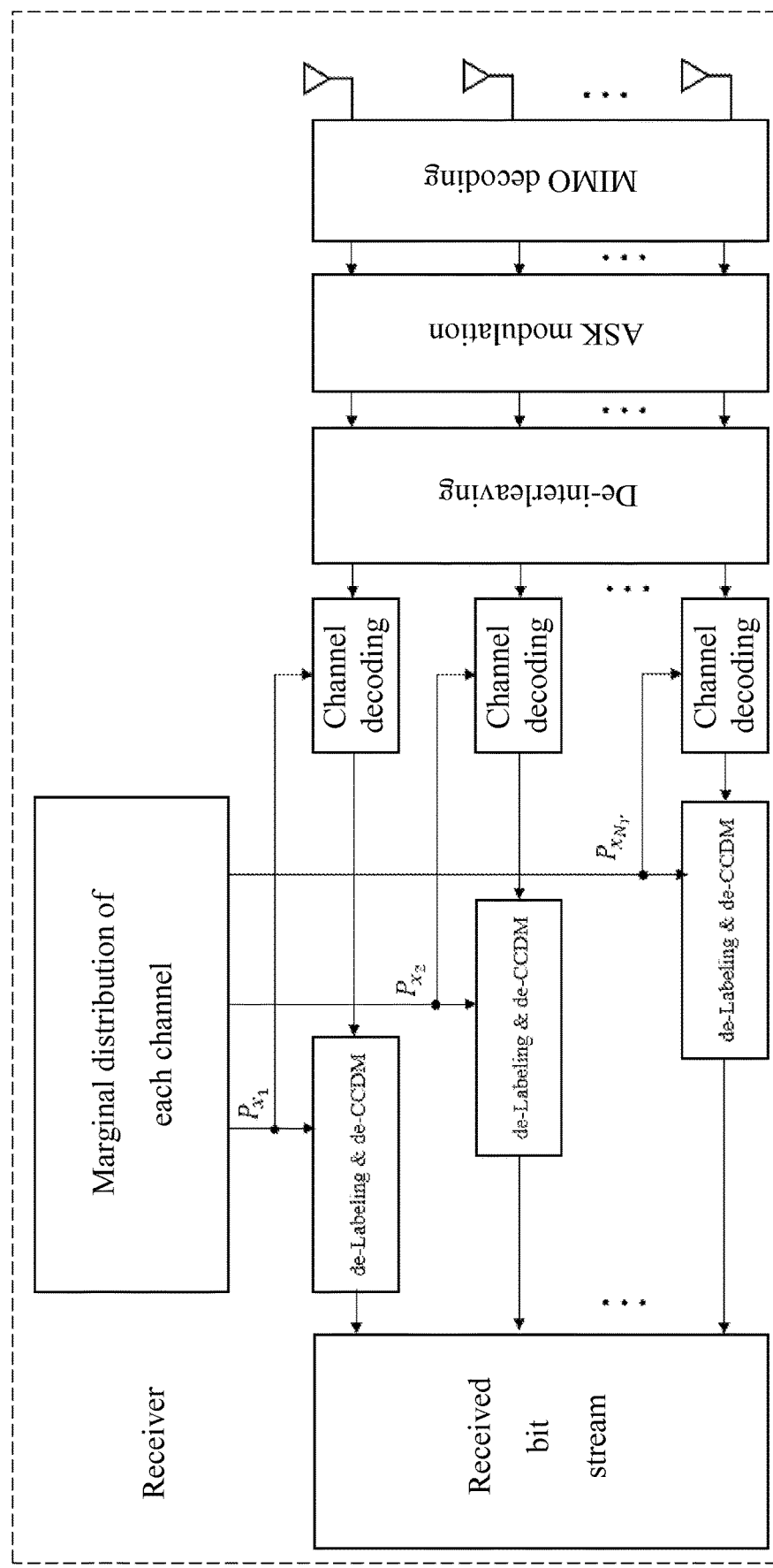
FIG. 2 is a schematic diagram of a receiver according to the present invention.

As shown in FIGS. 1, 2, an embodiment of the present invention provides a MIMO transmission method for discrete modulated signals. A MIMO transmission model for discrete modulated signals is y=HGΔx+n, where x is the source multi-dimensional vectors of initial multi-channel ASK constellation diagram symbols, y is received signals of each channel obtained by a receiver, H is a known channel matrix, G is a precoding matrix of MIMO, and Δ is a constellation expansion factor. In this embodiment, the precoding matrix G and a source distribution are jointly optimized at a transmitter, a mutual information between symbols of the transmitter and the receiver is theoretically maximized, and non-uniform distribution transmission under a MIMO scenario is realized in combination with the existing single-channel probabilistic amplitude shaping technology.

Specifically, the MIMO transmission method for discrete modulated signals in this embodiment includes the following steps:

(S1) The precoding matrix G is initialized;

(S2) For any constellation expansion factor Δ, a source entropy H(x) can be maximized by adjusting a source distribution $P_x$ of the source multi-dimensional vectors x; the constellation expansion factor Δ and source distribution $P_x$ are selected for maximizing the mutual information I(x;y) =H(x)−H(x|y) according to the current precoding matrix G, where H(x|y) is a conditional entropy. In this process, each of the constellation expansion factor Δ corresponds to a source distribution $P_x$ such that the source entropy H(x) is maximum under this constellation expansion factor Δ. As different constellation expansion factors Δ correspond to different maximum source entropies H(x), we choose the constellation expansion factor Δ that can maximize the mutual information I(x;y) and the corresponding source distribution $P_x$ that can maximize the source entropy H(x) under this constellation expansion factor Δ.

(S3) According to the current constellation expansion factor Δ and source distribution $P_x$, the precoding matrix G is adjusted by a gradient descent method to further maximize the mutual information I(x;y).

(S4) Whether the values of the current constellation expansion factor Δ, source distribution $P_x$ and precoding matrix G converge is determined, and if the values do not converge, step (S2) is performed; and (S5) A marginal distribution of the symbols of each channel in the source multi-dimensional vectors X is obtained according to the distribution of the source multi-dimensional vectors X, and non-uniform modulation is performed on the signals of each channel by a single-channel probabilistic amplitude shaping technology.

In step (S2), for any given constellation expansion factor Δ, maximum entropy optimization is performed on the source multi-dimensional vectors x by a Lagrange multiplier method, and an optional constellation expansion factor Δ and an optimal source distribution $P_x$ of the source multi-dimensional vectors x are finally determined by maximizing the mutual information I(x;y).

Step (S3) includes the following steps:

(S31) calculating a gradient expression of the mutual information I(s;y) on the precoding matrix G; and (S32) based on the gradient descent method, adjusting the value of each element in the current precoding matrix G; and if the adjusted precoding matrix G does not conform to a power limit, multiplying G by a zoom multiple on the basis of gradient adjustment to meet power requirements.

In the subsequent steps of the transmitter in this embodiment (see FIG. 1 for details), the present invention adopts the existing probabilistic amplitude shaping technology to perform non-uniform modulation and identification operation on the signals of each channel. The identified bit streams of each channel are transmitted to the channel after passing through the modules of channel coding, interleaving, modulation, MIMO precoding, and the like.

In this example, each module of the receiver is shown in FIG. 2, and performs a reverse process as done by each module of the transmitter.

The specific embodiments of the present invention are described above. It should be understood that the present invention is not limited to the specific implementations described above, and various changes or modifications may be made by those skilled in the art within the scope of the claims, which does not affect the essential contents of the present invention. The embodiments of the present application and the features in the embodiments can be combined with each other without conflicts.

What is claimed is:

1. A Multiple Input Multiple Output (MIMO) transmission method for discrete modulated signals, and a MIMO transmission model for the discrete modulated signals is y=HGΔx+n, where x is source multi-dimensional vectors of initial multi-channel Amplitude Shift Key (ASK) constellation diagram symbols, y is received signals of each channel obtained by a receiver, H is a known channel matrix, G is a precoding matrix of MIMO, and Δ is a constellation expansion factor; the method comprises the following steps:

(S1) initializing the precoding matrix G;

(S2) for any value of the constellation expansion factor Δ, maximizing a source entropy H(x) by adjusting a source distribution $P_x$ of the source multi-dimensional vectors x, and selecting the constellation expansion factor Δ and the source distribution $P_x$ for maximizing a mutual information I(x;y)=H(x)−H(x|y) according to the current precoding matrix G, where H(x|y) is a conditional entropy;

(S3) according to the current constellation expansion factor Δ and the source distribution $P_x$, adjusting the precoding matrix G by a gradient descent method to further maximize the mutual information I(x;y);

(S4) determining whether the values of the current constellation expansion factor Δ, the source distribution $P_x$ and the precoding matrix G converge, and if the values do not converge, performing step (S2); and (S5) obtaining a marginal distribution of the symbols of each channel in the source multi-dimensional vectors X according to the distribution of the source multi-dimensional vectors x, and performing a non-uniform modulation on the signals of each channel by a single-channel probabilistic amplitude shaping technology.

2. The MIMO transmission method for discrete modulated signals according to claim 1, wherein in step (S2), for any given value of the constellation expansion factor Δ, a maximum entropy optimization is performed on the source multi-dimensional vectors x by a Lagrange multiplier method, and an optional constellation expansion factor Δ and an optimal source distribution $P_x$ of the source multi-dimensional vectors x are finally determined by maximizing the mutual information I(x;y).

3. The MIMO transmission method for discrete modulated signals according to claim 1, wherein step (S3) comprises the following steps:

(S31) calculating a gradient expression of the mutual information I(s;y) on the precoding matrix G; and (S32) based on the gradient descent method, adjusting the value of each element in the current precoding matrix G; and if the adjusted precoding matrix G does not conform to a power limit, multiplying G by a zoom multiple on the basis of a gradient adjustment to meet power requirements.

* * * * *